United States Patent
Spieker et al.

(10) Patent No.: US 6,920,592 B2
(45) Date of Patent: Jul. 19, 2005

(54) SYSTEM, METHOD, AND APPARATUS FOR DETECTING AND RECOVERING FROM FALSE SYNCHRONIZATION

(75) Inventors: Thomas L. Spieker, San Juan Capistrano, CA (US); Frederick G. Walls, Tustin, CA (US); Jorge J. Wong, Mission Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 445 days.

(21) Appl. No.: 10/217,979

(22) Filed: Aug. 12, 2002

(65) Prior Publication Data

US 2004/0030966 A1 Feb. 12, 2004

(51) Int. Cl.[7] .................................. G06F 11/00
(52) U.S. Cl. ........................ 714/707; 714/763
(58) Field of Search ................. 370/509; 375/361, 375/354; 714/775, 758, 704, 707, 763

(56) References Cited

U.S. PATENT DOCUMENTS

| | | | | |
|---|---|---|---|---|
| 4,686,690 A | | 8/1987 | Sato | |
| 4,729,123 A | * | 3/1988 | Wheen | 370/509 |
| 5,479,456 A | * | 12/1995 | Rhebergen | 375/361 |
| 5,703,887 A | * | 12/1997 | Heegard et al. | 714/775 |
| 5,956,102 A | | 9/1999 | Lane | |
| 6,088,410 A | * | 7/2000 | Nobusawa | 375/354 |
| 6,643,815 B1 | * | 11/2003 | Davis et al. | 714/758 |

FOREIGN PATENT DOCUMENTS

EP          0380865          8/1990

* cited by examiner

*Primary Examiner*—David Ton
(74) *Attorney, Agent, or Firm*—McAndrews, Held & Malloy, Ltd.

(57) ABSTRACT

Presented herein are a system(s), method(s), and apparatus for detecting and recovering from false synchronization. False synchronization can be detected on the fly through either on an interrupt-driven basis or polling-driven basis. The number of incorrect checksums is compared to the number of uncorrectable errors detected. If the number of incorrect checksums is large compared to the number of uncorrectable errors detected, resynchronization occurs.

18 Claims, 8 Drawing Sheets

SYSTEM, METHOD, AND APPARATUS FOR DETECTING AND RECOVERING FROM FALSE SYNCHRONIZATION

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present application is directed to data communications, and more particularly to a system, method, and apparatus for detecting and recovering from false synchronization.

As the speed of Internet traffic increases, on-demand television and video are becoming closer and closer to reality. In addition to the increasing speed of Internet transactions, continued advancement of motion picture content compression standards permit high quality picture and sound while significantly reducing the amount of data that must be transmitted. One compression standard for television and video signals was developed by the Moving Picture Experts Group (MPEG), and is known as MPEG-2. The MPEG-2 compression compresses and packetizes the video content into MPEG-2 packets.

The MPEG-2 standard has a number of variants based on the specific transmission channel. For instance, the ITU specification J.83 Annex B (the J.83 specification) was developed for the transmission of digital data over a cable channel. The J.83 specification prescribes application of a parity checksum byte and forward error correction to the MPEG-2 packets, and is hereby incorporated by reference for all purposes. The foregoing allows for additional error detection and simultaneous error detection and synchronization.

The MPEG-2 packets are received as a continuous stream of serial data. Recovery of the original video content requires breaking the continuous stream of serial data into the individual constituent packets. Given the starting point of an MPEG-2 packet, the receiver can break the continuous stream into the individual constituent data packets by simply counting the number of bits received because the MPEG-2 packets are of a known uniform length (1504 bits). The starting point of a packet is determined by calculation and detection of a predetermined eight-bit checksum. Detection of the predetermined checksum is indicative of the beginning of an MPEG-2 packet. Detection of the predetermined checksum is used to establish MPEG synchronization and lock alignment. Once alignment has been locked, the absence of the predetermined checksum at expected locations (every 1504 bits) is indicative of bit errors.

Presently, MPEG synchronization is conditioned on receipt of a number of consecutive checksums. Each data packet contains 188 bytes or 1,504 bits. A checksum circuit could start looking at an arbitrary point within those 1,504 bits with equal probability. Since there is only one correct phase, 1,503 incorrect phases, and only 256 possible checksums, the first checksum reported as correct is likely to be in an incorrect phase. However, assuming the MPEG packets are not all identical, there is only a one in 256 chance that the next checksum will be reported as being correct if the synchronization is incorrect. There is a one in 65,536 chance that the next two correct checksums will be reported correct. The probability that the next five packets will be reported correct is less than one in a trillion. Since this probability rapidly approaches zero, false synchronization in this case can easily be avoided.

However, if five identical packets are received consecutively, the odds dramatically shift. The probability of synchronizing incorrectly the first attempt is the same, roughly 1,248 in 1,504. However, subsequent packets each guarantee the same checksum since data in the subsequent packets are the same. So, even after five packets, the probability of incorrectly synchronizing is still significant. One example where a number of consecutive identical packets are transmitted would be in a video on demand environment where channel usage varies depending on customer demand and MPEG NULL packets are used to fill up the unused bandwidth.

Another problem with conditioning MPEG synchronization on a number of consecutive checksums, is that calculation of many checksums requires a significant amount of time. The foregoing results in noticeable delays which are extremely undesirable during television channel change operations.

Another technique counts a given number of bad checksums out of a fixed window. For example, bad checksums are counted within a sliding window of 255 checksums. If the number of bad checksums exceeds a certain number, e.g., 50, the current synchronization is abandoned and resynchronization is attempted. The drawback to this approach is that normal bit errors can cause bad checksums and therefore, cause a resynchronization under noisy conditions, even where synchronization is correct.

Accordingly, it would be advantageous if false synchronization detection and recovery are guaranteed in a sufficient amount of time.

Further limitations and disadvantages of conventional and traditional approaches will become apparent to one of skill in the art, through comparison of such systems with embodiments of the present invention as set forth in the remainder of the present application with reference to the drawings.

BRIEF SUMMARY OF THE INVENTION

Presented herein are system(s), method(s), and apparatus for detecting and recovering from false synchronization. During false synchronization, after a sufficient time, an MPEG Framer detects incorrect checksums in the data packets at bit locations expected to indicate the start of an individual packet. However, incorrect checksums can be indicative of either false synchronization or general noisy conditions. False synchronization and general noisy conditions are distinguishable by uncorrectable Reed-Solomon (RS) errors. During general noisy conditions, uncorrectable RS errors become more likely. In contrast, false synchronization does not cause RS errors. Therefore, examination and comparison of incorrect checksums and RS errors can be used to accurately detect false synchronization.

The number of incorrect checksums and the number of uncorrectable RS errors are counted and compared. If the number of incorrect checksums are large compared to the number of uncorrectable errors, false synchronization is detected and resynchronization occurs.

False synchronization can be detected on the fly either on an interrupt-driven basis or a polling-driven basis. In the interrupt-driven basis, the comparison of the number of incorrect checksums and the number of uncorrectable RS errors is triggered when the number of incorrect checksums attains a certain value. In the polling-driven basis, the comparison of the number of incorrect checksums and the number of uncorrectable RS errors occurs at predetermined time intervals.

These and other advantages and novel features of the present invention, as well as details of an illustrated embodiment thereof, will be more fully understood from the following description and drawings.

BRIEF DESCRIPTION OF SEVERAL VIEWS OF THE DRAWINGS

The embodiments presented herein will be better understood with reference to the following figures.

DETAILED DESCRIPTION OF THE INVENTION

While the detailed description that follows is made with specific reference to the MPEG-2 standard, it should be understood that the aspects of the present invention may be applied to other streams of data requiring synchronization, including, for example, the DOCSIS Standard described in CableLabs Data-Over-Cable Service Interface Specifications (DOCSIS) SP-RFIv2.0.

Figure 1:
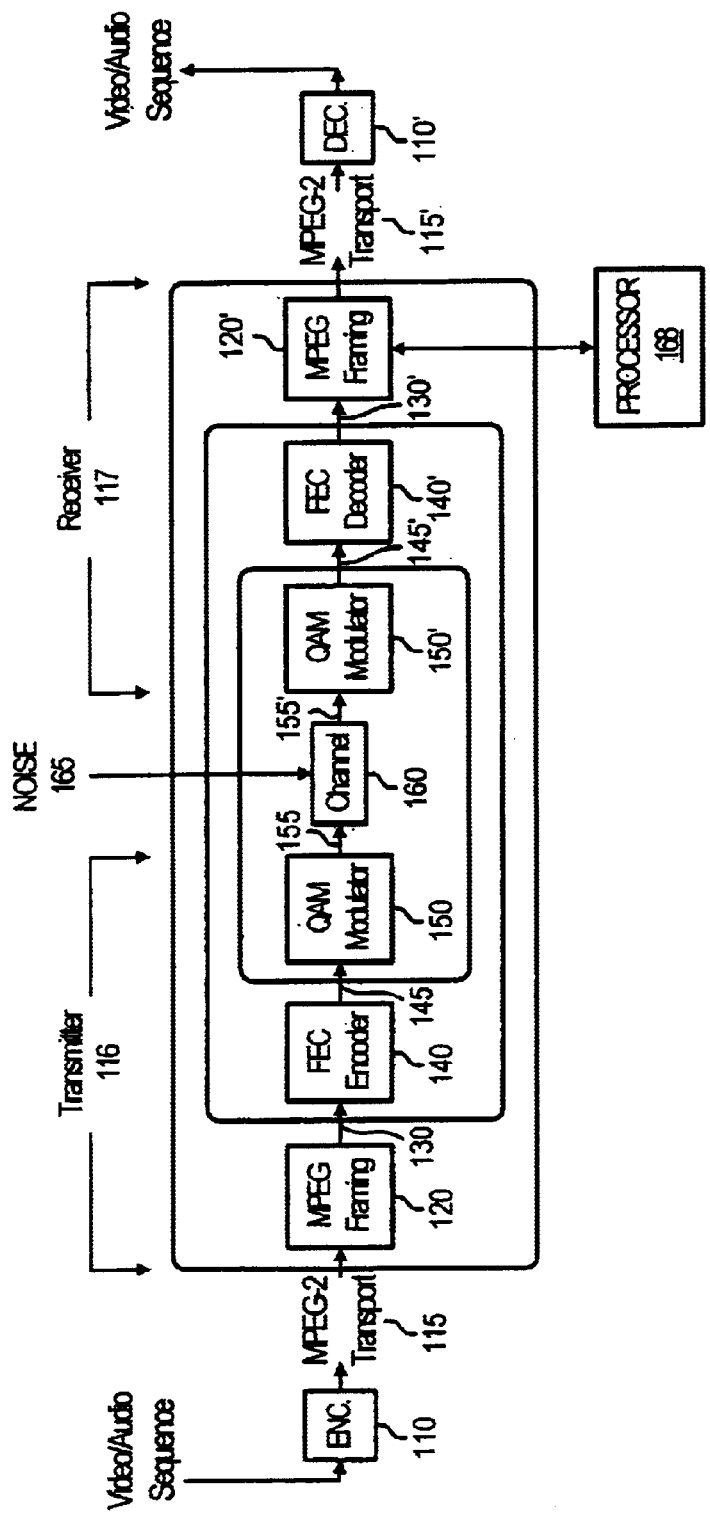
FIG. 1 is a block diagram of an exemplary cable transmission system.

Referring now to FIG. 1, there is illustrated a block diagram of an exemplary cable transmission system for transmitting MPEG packets 115 from a transmitter 116 to a receiver 117. The MPEG packets 115 include packets of compressed data output from an MPEG Encoder 110. The compressed data represents a video/audio sequence. The MPEG Encoder 110 receives the video/audio sequence and processes the video/audio sequence in accordance with the MPEG-2 standard. The MPEG-2 standard is described in detail in ITU-T Recommendation H.222.0 (1995) | ISO/IEC 13818–1:1996, *Information Technology—Generic Coding of Moving Pictures and Associated Audio Information Systems*, which is hereby incorporated by reference for all purposes.

Figure 2:
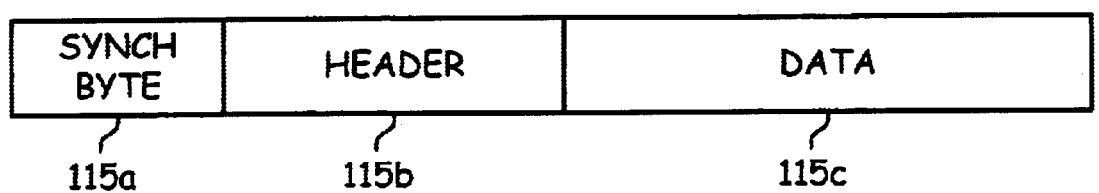
FIG. 2 is a block diagram of a data packet in accordance with the MPEG-2 standard.

Referring now to FIG. 2, there is illustrated a block diagram of an MPEG-2 packet 115. The MPEG-2 packet 115 comprises 188 bytes, with one byte 115a for synchronization purposes, three bytes 115b for a header, followed by 184 bytes 115c of data. The synchronization byte 115a is specified to have a constant value of 0×47. The header 115b contains service identification, scrambling, and control information.

Referring again to FIG. 1, the transmitter 116 includes MPEG Framing 120, a Forward Error Correction (FEC) encoder 140, and a Quadrature Amplitude Modulation (QAM) modulator 150. The MPEG Framing 120 calculates and places a parity checksum byte into the synchronization byte 115a of the MPEG packets 115. The FEC encoder adds layers of error correction to the MPEG packets 115. The QAM modulator 150 modulates and transmits the MPEG packets 115.

The MPEG-2 packets 115 are received by MPEG framing 120. Pursuant to the ITU specification J.83 Annex B for transmission of digital data over cable, the MPEG framing 120 adds an additional layer of processing which utilizes the information bearing capacity of the synchronization byte 115a. A parity checksum which is a coset of a finite input response parity check linear block code is substituted for the synchronization byte 115a, thereby supplying improved packet delineation functionality and error detection capability.

Figure 3:
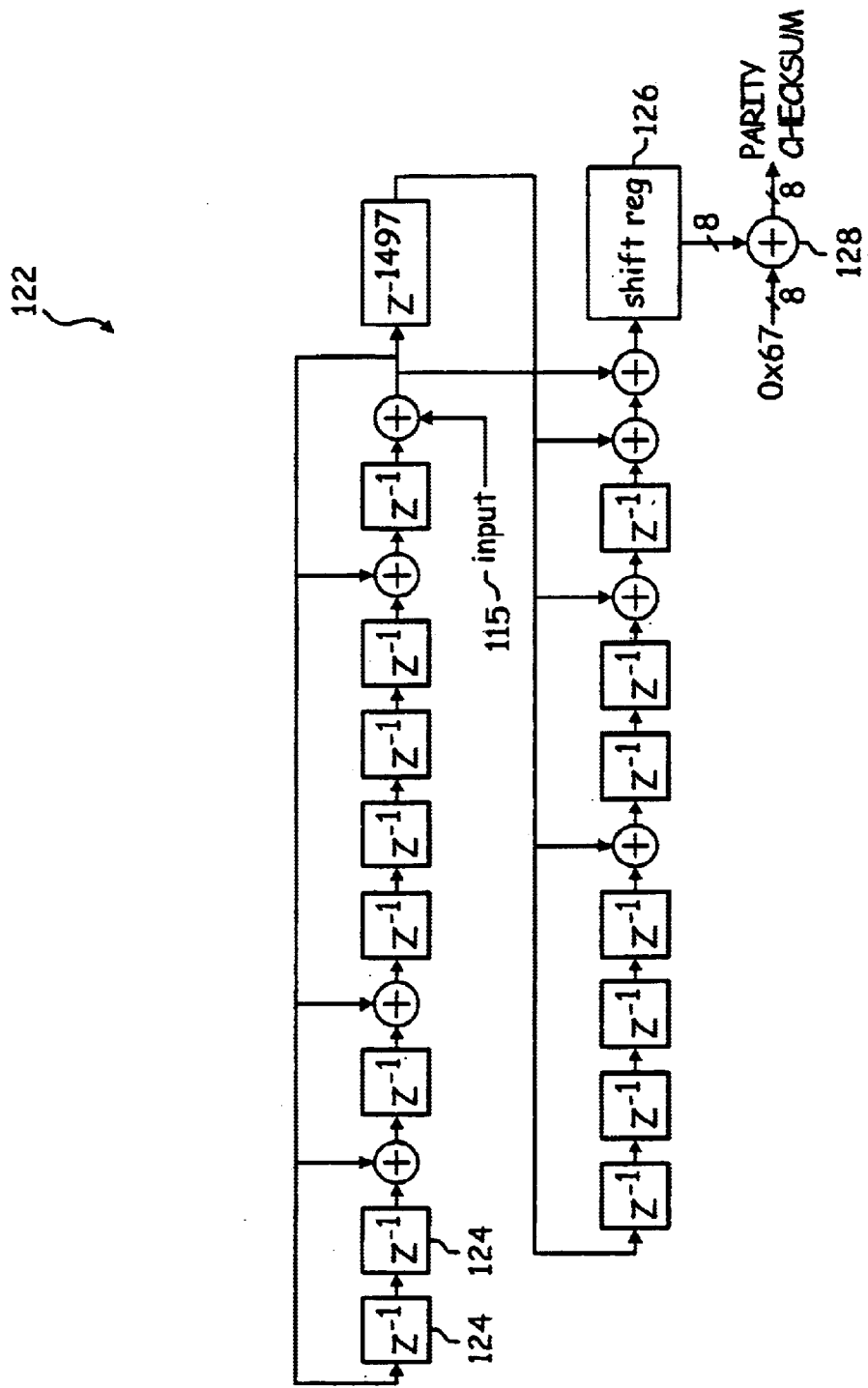
FIG. 3 is a block diagram of an exemplary checksum generator.

Referring now to FIG. 3, there is illustrated an exemplary checksum generator for generating the parity checksum. The checksum generator comprises a linear feedback shift register (LFSR) 122. The LFSR 122 is described by the following equation:

$$f(X)=[1+b(X)X^{1497}]/g(X)$$

where $g(X)=1+X+X^5+X^6+X^8$ and $$b(X)=1+X+X^3+X^7$$

All addition operations in the LFSR 122 are modulo-2 based. The LFSR 122 is first initialized so that all memory elements 124 contain zero value. The synchronization byte 115a is removed from the MPEG packet. The header 115b and the data 115c portions (1496 bits) of an MPEG packet are shifted into the LFSR 122. The encoder input is set to zero after the header 115b and data portions 115c are received, and eight additional shifts are required to sequentially output the last remaining bits onto shift register 126. An offset of 0×67 is added at adder 128 to contents in the shift register 126. The output of the adder 128 is the parity checksum. The parity checksum is concatenated to the header portion 115b and the data portion 115c. The foregoing causes a 0×47 result to be produced during checksum decoding.

Figure 4:
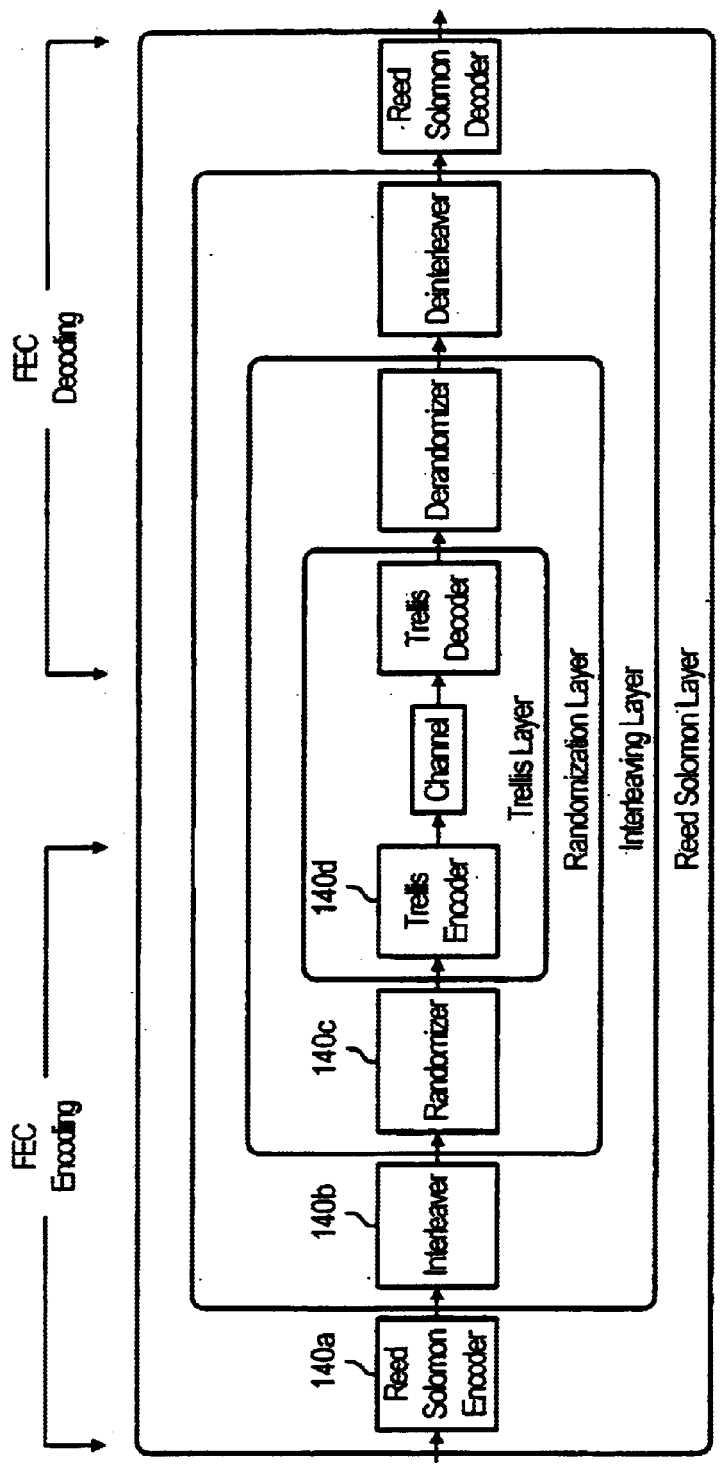
FIG. 4 is a block diagram of an exemplary forward error correction encoder/decoder system.

The MPEG packets (with the parity checksum) 130 are sent to the FEC encoder 140. Referring now to FIG. 4, there is illustrated an exemplary FEC encoder 140. The FEC encoder 140 comprises four layers of processing. The four layers of processing include a Reed-Solomon (RS) encoder 140a, an interleaver 140b, a randomizer 140c and a Trellis encoder 140d. The RS encoder 140a provides block encoding and decoding to correct up to three symbols within each encoded block. The interleaver 140b evenly disperses the symbols, protecting against a burst of symbol errors. The randomizer 140c randomizes the data on the channel to allow effective QAM demodulator synchronization. The Trellis encoder 140d provides convolutional encoding.

Referring again to FIG. 1, the MPEG packets 145 output from the FEC encoder 140 are modulated and transmitted by the QAM modulator 150. The QAM modulator 150 transmits the modulated MPEG packets 155 over a communication channel 160, e.g., a cable 160.

Those skilled in the art will recognize that there is a degree of noise 165 over the channel 160. For example, a cable channel 160 is primarily regarded as a bandwidth-limited channel corrupted by a combination of noise, interference, and multi-path distortion. The noise results in receipt of modulated MPEG packets 155' which are equivalent to modulated MPEG packets 155 plus the noise 165 at the receiver 117.

The receiver 117 processes the received modulated MPEG packets 155', providing MPEG packets 115' to MPEG Decoder 110'. The MPEG Decoder 110' decompresses the MPEG packets 115' to recover a video/audio sequence which is a high-quality replication of the original video/audio sequence. The receiver 117 includes QAM demodulator 150', a FEC decoder 140', and an MPEG Framer 120'. The QAM demodulator 150' demodulates the received modulated MPEG packets 155'. The FEC decoder 140' reverses the layers of error correction applied by FEC encoder 140, and detects and corrects errors in the MPEG packets 155'. The MPEG Framer 120' is used for synchronization purposes.

The received modulated MPEG packets 155' are demodulated by the QAM demodulator 150'. The channel noise 165 can result in bit errors when the received modulated MPEG packets 155' are demodulated by the QAM demodulator 150'.

The MPEG packets 145' are received by the FEC decoder 140' which reverses the layers of error correction applied by FEC encoder 140. Decoding of the layers of error correction applied by FEC encoder 140 allows both detection and, possibly, correction of the error data signal, up to a certain maximum number of bit errors, in a manner well known in the art. For example, the RS error correction layer is (128, 122) and has the ability to correct 3 or less RS symbol errors. The RS error correction layer is described in further detail in Section B.5.1 of ITU-T Recommendation J.83, Television and Sound Transmission—Digital Multi-Programme Systems for Television Sound and Data Services for Cable Distribution, which is hereby incorporated by reference for all purposes. Symbol errors in excess are uncorrectable. The result are MPEG packets 130' which are ideally identical to the MPEG packets 130.

It is noted that the MPEG packets 130' are received as a continuous stream. Continued processing of the MPEG packets 130' requires breaking the continuous stream into the individual constituent MPEG packets 130'. With the starting point of an individual MPEG packet 130' in the continuous stream, the continuous stream can be broken into the individual constituent MPEG packets by simply counting the number of bits received because the packets are of a known uniform length.

Figure 5:
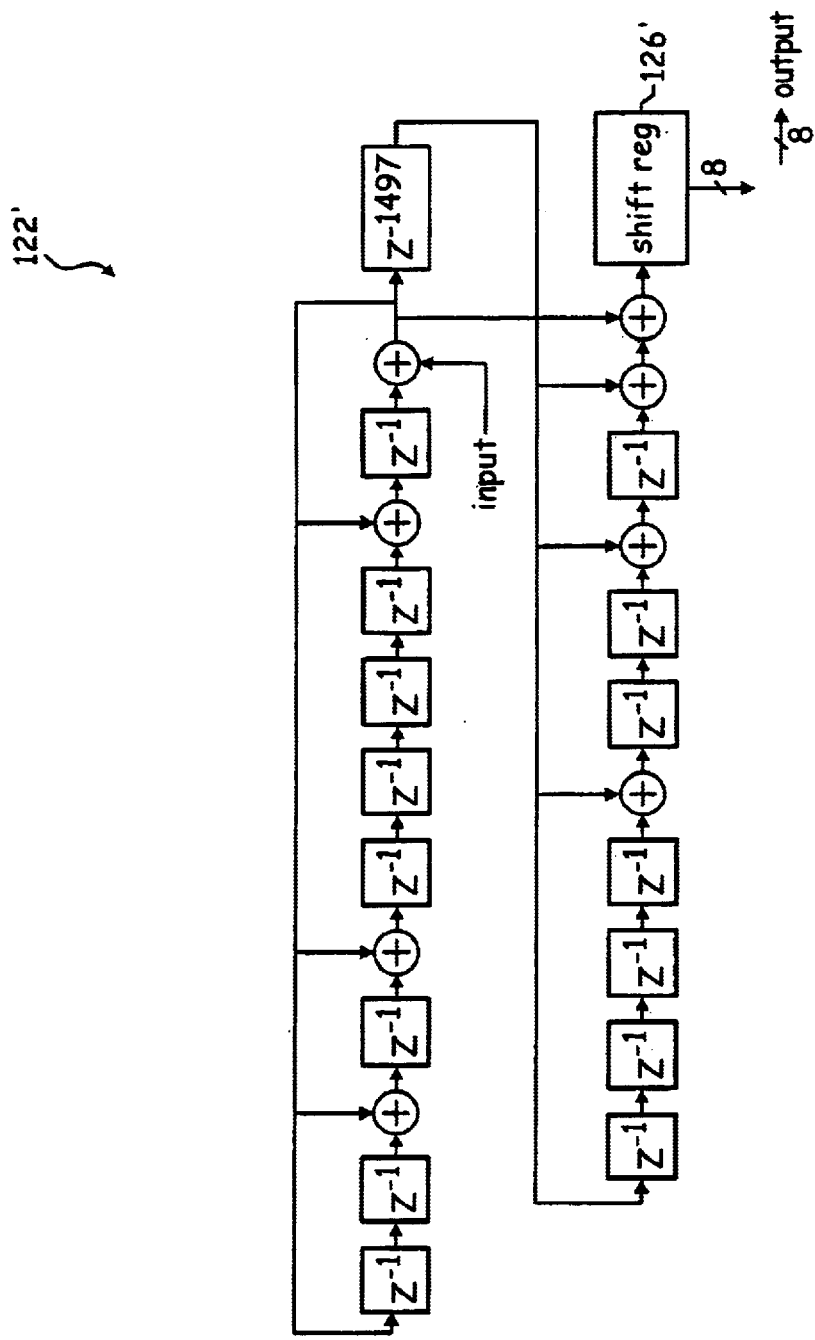
FIG. 5 is a block diagram of an exemplary checksum decoder circuit.

The MPEG packets 130' are received by MPEG-2 Framing 120'. The MPEG-2 Framing 120' which breaks the MPEG packets 130' into MPEG packets 115'. The MPEG-2 Framing 120', includes a decoder circuit which can be implemented by an LSFR. Referring now to FIG. 5, there is illustrated a block diagram of an exemplary LSFR 122' configured for calculation of the checksum of incoming MPEG packets 130'. The LSFR 122' is similar to the LSFR 122 of FIG. 2, except that no offset is added to the shift register 126'.

The MPEG packets 130' are received as a serial data bit stream at input. The decoder circuit 122' computes a sliding checksum on the input serial data bit stream stored in shift register 126'. Based on the encoding of the MPEG packets 130', when the 1504 bits forming a single frame packet 130' are received in the decoder circuit 122' (in the delay units Z), the checksum generated in the shift register 126 is 0×47. Accordingly, detection of 0×47 in the register 126 is used to detect the start of an MPEG-2 packet 130'. Once the start of a packet is detected, a locked alignment is established and the absence of a valid code (0×47) at the expected bit interval (every 1504 bits) is indicative of an error. Simultaneous packet synchronization and error detection are supported in the foregoing manner.

The MPEG Framing 120' is operable in two modes—a synchronization lock mode and a resynchronization mode. While in the synchronization lock mode, bit alignment is established and the absence of the valid code (0×47) in the shift register 126 at the expected bit interval (every 1504 bits) is indicative of an error. While in the resynchronization mode, bit alignment is not established. The shift register 126 is monitored for the valid code. Detection of a valid code is indicative of the start of a packet.

The specific mode in which the MPEG Framing 120' operates is controlled by the processor 168. The processor 168 controls the modes of operation of the MPEG Framing 120' in a manner to detect and recover from false synchronization. As noted above, there is a considerable probability of false synchronization wherein synchronization is based on detection of a predetermined checksum. False synchronization is detected by the existence of incorrect checksums at later appropriate bit intervals (every 1504 bits).

Incorrect checksums can also occur due to general noisy conditions. Noisy conditions cause a large number of bit errors to occur, thereby causing incorrect checksum calculations to occur, even if receipt of the data packet is properly synchronized. However, the large number of bit errors can also be detected by the forward error correcting code, resulting in a significant number of uncorrectable RS errors. Therefore incorrect checksums caused by noisy conditions result in comparable numbers of uncorrectable RS errors and incorrect checksums.

In contrast, false synchronization causes incorrect checksums but does not cause uncorrectable RS errors to be detected. Therefore, incorrect checksums caused by false synchronization result in significantly more incorrect checksums compared to the number of uncorrectable RS errors.

Accordingly, false synchronization can be detected and recovered from by comparison of the RS errors and the number of incorrect checksums. Where incorrect checksums are detected, but are comparable to the number RS errors, the processor 168 leaves the MPEG Framing 120' in the synchronization lock mode, in spite of the incorrect checksums. However, where incorrect checksums are detected which significantly exceed the number of RS errors, the likelihood of false synchronization increases. Therefore, the processor 168 sets the MPEG Framing 120' to operate in the resynchronization mode.

Figure 6:
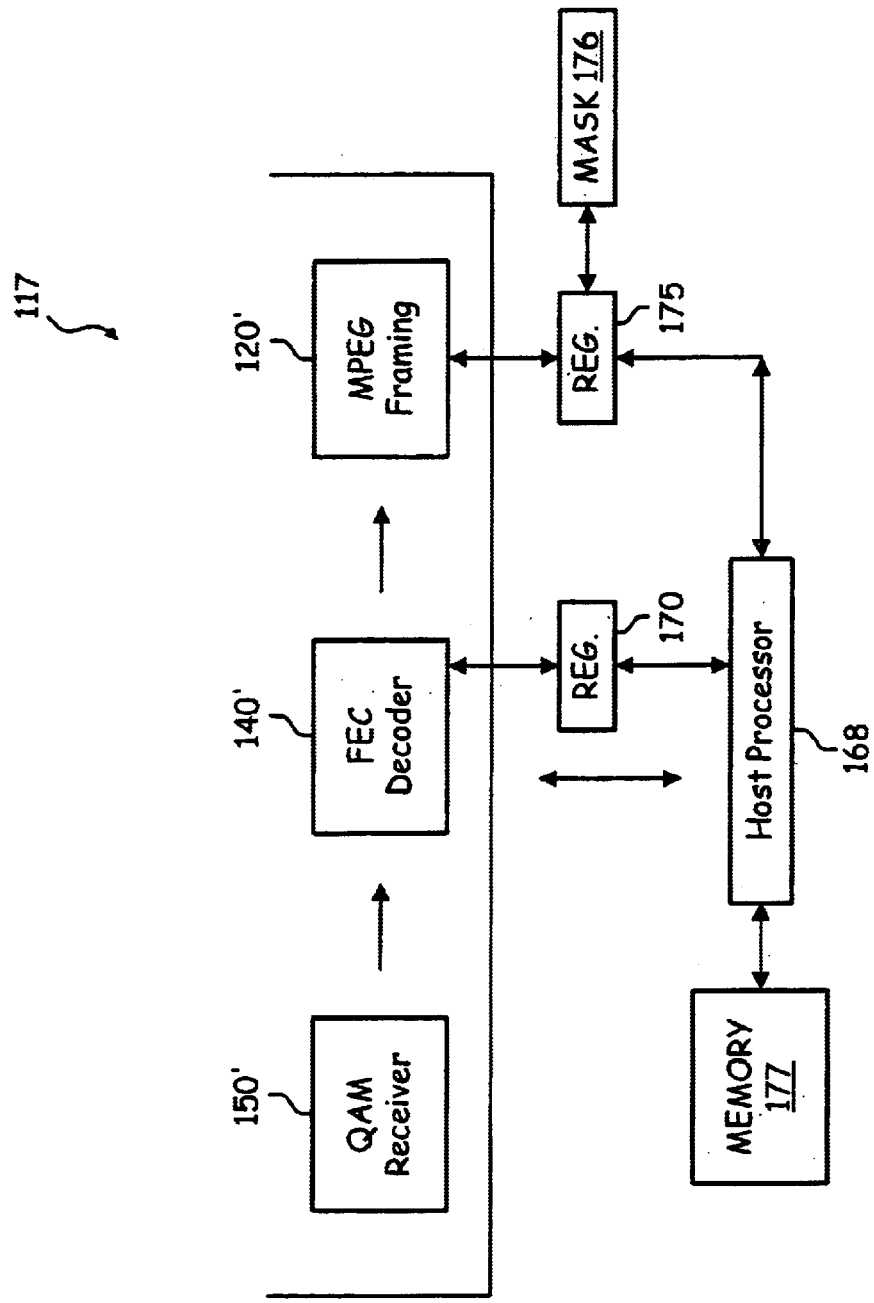
FIG. 6 is a block diagram of an exemplary receiver in accordance with one embodiment of the present invention.

Referring now to FIG. 6, there is illustrated a detailed block diagram of an exemplary receiver 117. The FEC decoder 140' and the MPEG Framing 120' are connected to registers 170 and 175, respectively. Although the registers 170 and 175 are shown as separate from the processor 168, it is noted that the registers 170 and 175 may also be part of the processor 168. Register 170 maintains a count of RS errors detected by the FEC decoder 140'. The processor 168 resets the register 170 to 0×00 to start the count of packet errors. When the FEC decoder 140' experiences uncorrectable RS errors, the FEC decoder 140' transmits a signal to register 170 causing the register 170 to increment. Similarly, register 175 maintains count of errors detected by the MPEG Framing 120' while the MPEG Framing 120' is in the synchronization locked mode.

Register 175 is associated with a programmable mask 176. Although the programmable mask 176 is shown separate from the processor 168, the programmable mask 176 may be implemented using a register of the processor 168.

The programmable mask 176 is programmable by the processor 168 and stores a predetermined value. When the register 175 equals the value in the mask 176, a signal is transmitted to the processor 168. The signal is received as an interrupt at the processor 168.

Responsive to the interrupt, the processor 168 executes an interrupt subroutine stored in memory 177. The interrupt subroutine causes the processor 168 to compare register 170 and register 175. Wherein the value stored in register 175 exceeds the value stored in register 170 by a predetermined factor, for example 2.5, the processor 168 determines that a false synchronization has occurred. The processor 168 transmits a signal to the MPEG Framing 120' causing the MPEG 120'Framing to enter the resynchronization mode. The processor 168 also transmits a reset signal to the registers 170 and 175 clearing the registers.

If the value stored in register 175 does not exceed the value stored in register 170 by the predetermined factor, the processor 168 determines that synchronization is correct and leaves the MPEG Framing 120' in the synchronization lock mode, and takes no further interaction.

The processor 168 can also detect and recover from false synchronization by polling the register 170 and register 175 at regular time intervals, and comparing the contents. Again, if the value stored in register 175 does not exceed the value stored in register 170 by the predetermined factor, the processor 168 determines that synchronization is correct and leaves the MPEG Framing 120' in the synchronization lock mode, and takes no further interaction.

The receiver 117 as described herein may be implemented as a board level product, as a single chip, application specific integrated circuit (ASIC), or with varying levels of the receiver 117 integrated on a single chip with other portions of the system as separate components. The degree of integration of the monitoring system will primarily be determined by speed of incoming MPEG packets, and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor can be implemented as part of an ASIC device wherein the memory 177 storing the interrupt subroutine is implemented as firmware.

Figure 7:
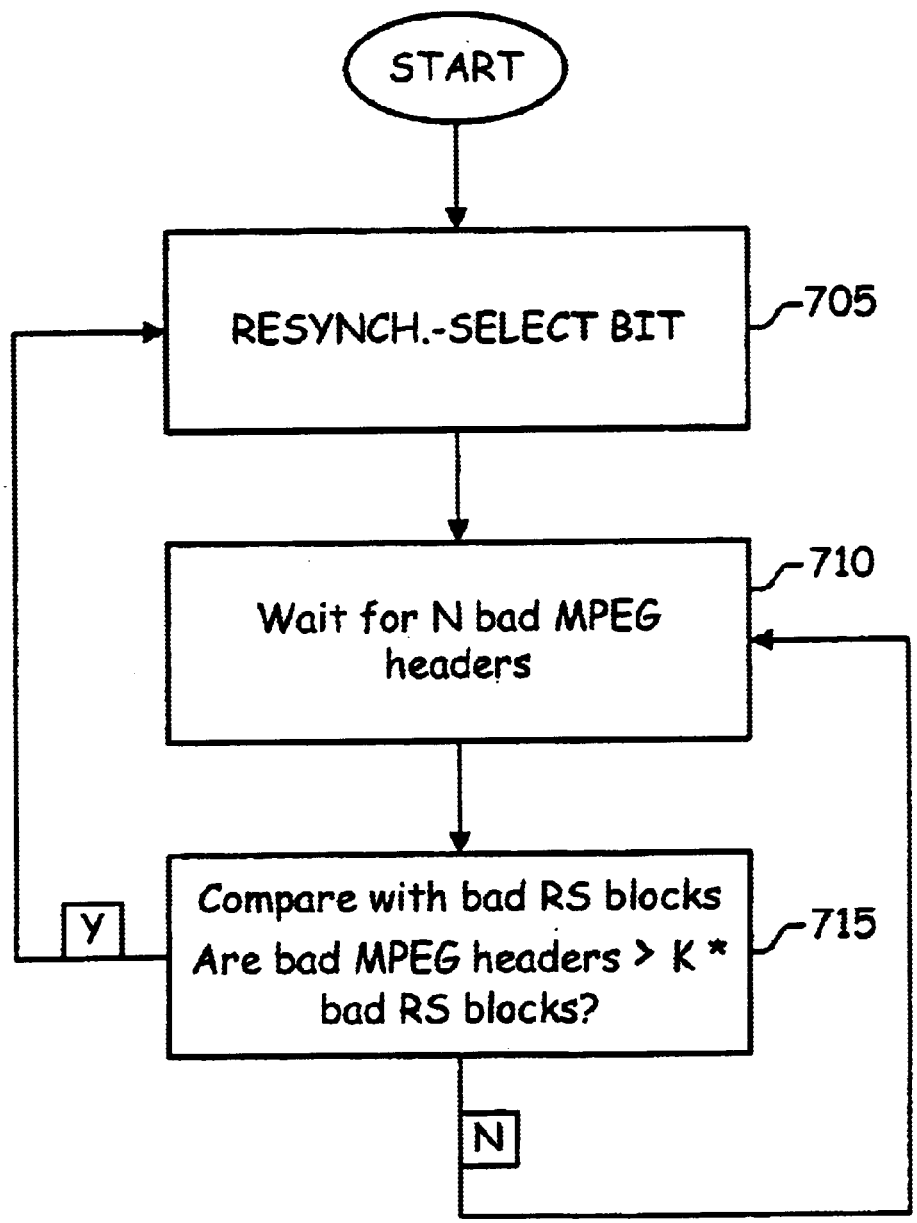
FIG. 7 is a flow diagram of interrupt-driven false synchronization detection and recovery in accordance with one embodiment of the present invention.

Referring now to FIG. 7, there is illustrated a flow diagram describing interrupt driven false synchronization detection and recovery. At 705, a bit in a serial data bit stream is selected as the start of an MPEG packet. The error correction decoding and checksum calculation are performed on the serial data bit stream beginning with the arbitrary bit. At 710, the number of incorrect checksums occurring in phase with the arbitrary bit and uncorrectable errors are counted until the number of incorrect checksums reaches a predetermined number. When the number of incorrect checksums reaches the predetermined number, the number of incorrect checksums is compared to the number of uncorrectable errors received (715).

When the number of incorrect checksums exceeds the number of detected uncorrectable errors during 715 by a predetermined factor, another bit is selected (705) as the start of the data packet and 705–715 are repeated. When the number of incorrect checksums is comparable to the number of detected uncorrectable errors during 715, synchronization on the bit selected during 705 is maintained and 710–715 are repeated.

Figure 8:
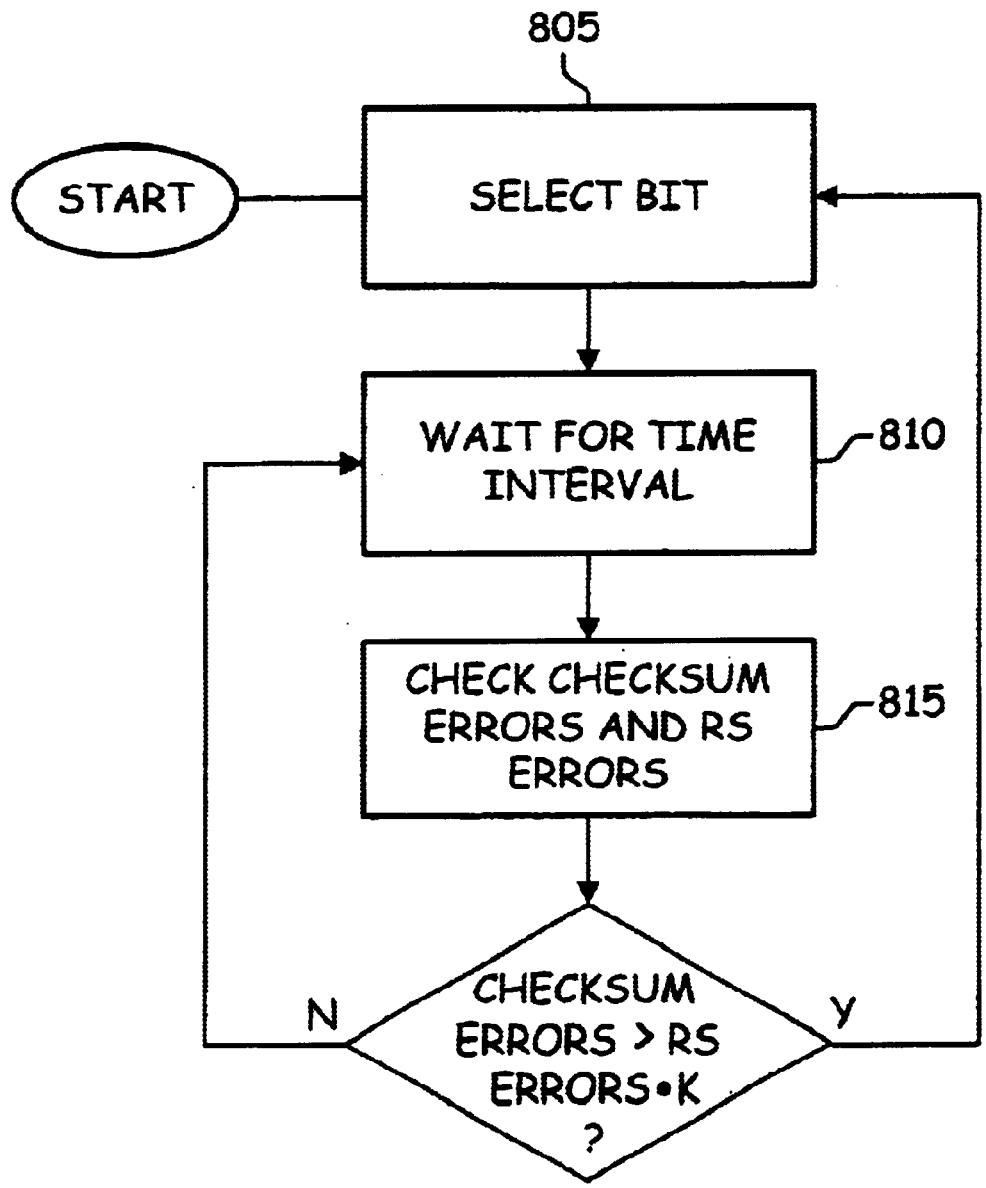
FIG. 8 is a flow diagram of polling-driven false synchronization detection and recovery in accordance with one embodiment of the present invention.

Referring now to FIG. 8, there is illustrated a signal flow diagram describing polling driven false synchronization detection and recovery. At 805, a bit in the serial data bit stream is chosen as the start of an MPEG packet, and the number of checksum errors in phase with the selected bit are counted. The processor 168 waits for a predetermined time interval at 810. While the processor is waiting at 810, the number of checksum errors in phase with the selected bit and the number of RS errors are counted. At the completion of the time interval, the processor 168 checks (815) and compares (820) the number of checksum errors to the number of uncorrectable RS errors.

If the number of incorrect checksums exceeds the number of detected uncorrectable errors during 820 by a predetermined factor, another bit (805) is selected as the start of the data packet and 805–820 are repeated. If the number of incorrect checksums is comparable to the number of detected uncorrectable errors during 820, synchronization on the bit selected during 805 is maintained and 810–820 are repeated.

Based on the foregoing, those skilled in the art should now understand and appreciate that the foregoing advantageously provides a technique for guaranteeing false synchronization detection and recovery in a sufficient period of time, and offers an additional layer of protection from a potentially hazardous false synchronization condition. As the detection and recovery can be interrupt-driven, error recovery, in one embodiment, occurs only when necessary, thereby resulting in lower overhead in terms of software and host intervention.

As will be recognized by those skilled in the art, the innovative concepts described in the present application can be modified and varied over a wide range of applications. For example, the embodiments described in FIGS. 7 and 8 can be implemented as a series of instructions stored in a memory, such as memory 177, and which are executable by a processor, such as processor 168. Accordingly, the scope of the present application should not be limited to any of the specific exemplary teachings discussed, but is only limited by the following claims and equivalents thereof.

What is claimed is:

1. A receiver for receiving data packets, said receiver comprising:
    a first memory for counting a number of uncorrectable bit errors detected in the data packets by an error correction decoder;
    a second memory for counting a number of incorrect checksums associated with the data packets; and
    a processor for comparing contents of the first memory and the second memory and resynchronizing receipt of the data packets, if the contents of the second memory exceed the contents of the first memory by a predetermined factor.

2. The receiver of claim 1, wherein the first memory comprises a first register, and wherein the second memory comprises a second register.

3. The receiver of claim 1, further comprising:
    a mask for storing a predetermined number; and
    wherein an interrupt is sent to the processor responsive to the second memory counting the predetermined number of incorrect checksums.

4. The receiver of claim 1, further comprising:
    a linear feedback shift register for calculating the checksums associated with the data packets; and
    wherein the second memory increments the number of incorrect checksums, responsive to the linear feedback shift register calculating a checksum that is different from an expected predetermined checksum.

5. The receiver of claim 4 wherein the linear feedback shift register is operable in one of two modes, the two modes including:
- a first mode wherein the linear feedback shift register detects incorrect checksums at predetermined bit intervals of the data packets; and
- a second mode wherein the linear feedback shift register detects checksums equivalent to the predetermined checksum; and
- wherein the linear feedback shift register operates in the first mode, responsive to detecting a checksum equivalent to the predetermined checksum while operating in the second mode.

6. The receiver of claim 5, wherein the linear feedback shift register operates in the second mode, responsive to the processor resynchronizing receipt of the data packets.

7. The receiver of claim 1, wherein the processor polls the contents of the first memory and the second memory at predetermined time intervals.

8. The receiver of claim 1, wherein the uncorrectable bit errors further comprise Reed-Solomon errors.

9. A method for receiving data packets, said method comprising:
- counting a number of uncorrectable bit errors in the data packets;
- counting a number of incorrect checksums associated with the data packets;
- comparing the number of uncorrectable bit errors to the number of incorrect checksums; and
- resynchronizing receipt of the data packets, if the number of incorrect checksums exceed the number of uncorrectable bit errors by a predetermined factor.

10. The method of claim 9, wherein comparing the number of uncorrectable errors to the number of incorrect checksums is responsive to counting a predetermined number of incorrect checksums.

11. The method of claim 9, wherein comparing the number of uncorrectable errors to the number of incorrect checksums further comprises:
- comparing the number of uncorrectable errors to the number of incorrect checksums at predetermined time intervals.

12. The method of claim 9, wherein counting the number of incorrect checksums further comprises:
- counting the number of checksums that are different from an expected predetermined checksum at predetermined bit intervals within the data packets.

13. The method of claim 12 further comprising:
- detecting a checksum equivalent to the expected predetermined checksum at a particular bit in the data packets; and
- detecting incorrect checksums at predetermined bit intervals from the particular bit of the data packets responsive to detecting the checksum.

14. The method of claim 9, wherein resynchronizing receipt of the data packets further comprises:
- detecting a checksum equivalent to the expected predetermined checksum at a particular bit in the data packets.

15. A circuit for synchronizing receipt of data packets, said circuit comprising:
- a first memory connected to an error correction decoder and to a linear feedback shift registers;
- a processor connected to said first memory;
- a second memory connected to the processor, said second memory storing a plurality of instructions executable by the processor, wherein the plurality of instructions comprise means for:
  - comparing contents of the first memory to the contents of the second memory; and
  - resynchronizing receipt of the data packets, if the contents of the second memory exceed the contents of the first memory by a predetermined factor.

16. The circuit of claim 15, wherein the first memory comprises a third memory and a fourth memory, wherein the third memory comprises a first register, and wherein the fourth memory comprises a second register.

17. The circuit of claim 15, further comprising:
- a mask connected to the first memory, said mask storing a predetermined number;
- wherein the first memory transmits an interrupt to the processor, responsive to the first memory storing the predetermined number; and
- wherein the processor executes the executable instructions, responsive to receiving the interrupt.

18. The circuit of claim 15, wherein the executable instructions further comprise means for:
- polling the contents of the first memory and the second memory at predetermined time intervals.

* * * * *